J. Dunlap,
Halter,
Nº 85,075.   Patented Dec. 22, 1868.

Witnesses,
C. R. Crisman
J. K. Long

Inventor;
John Dunlap

United States Patent Office.

JOHN DUNLAP, OF MADISON TOWNSHIP, PENNSYLVANIA.

Letters Patent No. 85,075, dated December 22, 1868.

IMPROVED HORSE-BLINDER.

The Schedule referred to in these Letters Patent and making part of the same.

*To all whom it may concern:*

Figure 1:
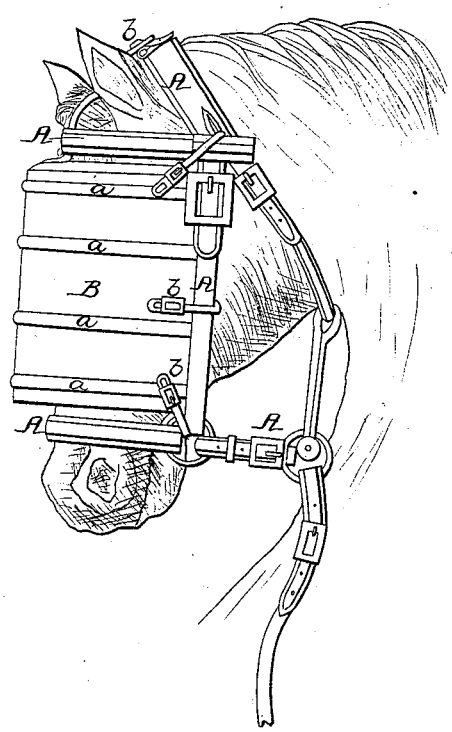
Figure 2:
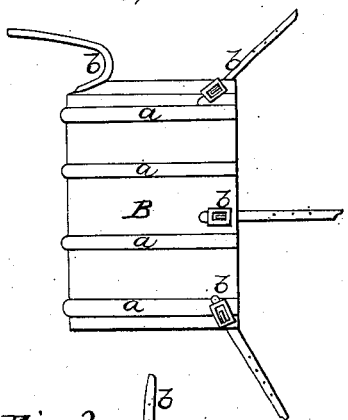
Figure 3:
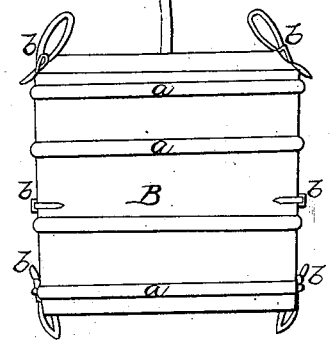

Be it known that I, JOHN DUNLAP, of the township of Madison, in the county of Clarion, and State of Pennsylvania, have invented a new and improved Mode of Preventing Breachy Horses and Cattle from Breaking and Jumping Fences; and I do hereby declare that the following is a full description thereof, reference being had to the accompanying drawings, (Figures 1, 2, and 3,) herewith presented.

The nature of my invention, which I wish to secure by Letters Patent, consists of a halter, A, with a blind, B, fastened over the eyes of the animal, extending down to the nose, with wire spring $a$ passing over the blind, to protect the eye from injury, leaving sufficient light for the animal to see to walk and graze.

The benefit of this invention is that it does not confine the animal, that there is no danger of injuring its limbs in any way, and that the animal can lie down and rest, and get up, with as much ease as if it were not confined.

It is superior for its utility, being very light and handy, and can be carried by the animal, and be of very little inconvenience in travelling.

The blind, being fastened with buckles $b$, can be removed with ease, while there is no other invention of the kind that can be applied in the same manner.

The nature of the invention is that the animal cannot see on either side, nor any great distance ahead, and hence cannot see to break or jump over the fence.

What I claim as my invention, and desire to secure by Letters Patent, is—

The application of a blind (constructed in such a manner as is more fully described in the accompanying specification) to a halter, to prevent breachy horses and cattle from breaking or jumping fences.

JOHN DUNLAP.

Witnesses:
 C. R. CUSMAN,
 J. W. LONG.